Patented Jan. 27, 1953

2,626,906

UNITED STATES PATENT OFFICE 2,626,906

PROCESS FOR BREAKING PETROLEUM EMULSIONS

Melvin De Groote, University City, Mo., assignor to Petrolite Corporation, a corporation of Delaware No Drawing. Application December 29, 1950, Serial No. 203,531

11 Claims. (Cl. 252—340)

The present invention is a continuation-in-part of my co-pending application Serial No. 104,801, filed July 14, 1949, now Patent 2,552,528, granted May 15, 1951.

This invention relates to processes or procedures particularly adapted for preventing, breaking or resolving emulsions of the water-in-oil type, and particularly petroleum emulsions. Complementary to the above aspect of the invention herein disclosed is my companion invention concerned with the new chemical products or compounds used as the demulsifying agents in said aforementioned processes or procedures, as well as the application of such chemical compounds, products, or the like, in various other arts and industries, along with the method for manufacturing said new chemical products or compounds which are of outstanding value in demulsification. See my co-pending application Serial No. 203,532, filed December 29, 1950.

My present invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned, are of significant value in removing any impurities, particularly inorganic salts, from pipeline oil.

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

My aforementioned co-pending application Serial No. 104,801 is concerned with a process for breaking petroleum emulsions of the water-in-oil type, characterized by subjecting the emulsion to the action of a demulsifier including high molal oxypropylation derivatives of polyhydric compounds, which polyhydric compounds are free from radicals having at least 8 uninterrupted carbon atoms, have at least 4 hydroxyl radicals, have a molecular weight not over 1200, and are water-soluble and xylene-insoluble, and which oxypropylated products have a molecular weight between 2000 and 30,000, a ratio of propylene oxide per hydroxyl within the range of 7 to 70, with the propylene oxide representing at least 87½%, by weight, of the product, the molecular weights and ratios being based upon the assumption of complete reaction between the propylene oxide and the polyhydric reactant and on an average statistical basis.

In said aforementioned co-pending application Serial No. 104,801, filed July 14, 1949, it was pointed out that demulsifying agents of the kind employed in the process of said co-pending application could be subjected to further reaction to yield equally effective and valuable demulsifying agents for the resolution of water-in-oil emulsions, as found in the petroleum industry.

Among such derivatives were esters obtained by reaction with polycarboxy acids such as polycarboxy acids commonly used in forming plasticizers, polyester resins, etc. One may use a tricarboxy acid, such as tricarballylic acid, or citric acid, but my preference is to employ a dicarboxy acid, or acid anhydride, such as oxalic acid, maleic acid, tartaric acid, citraconic acid, phthalic acid, adipic acid, succinic acid, azeleic acid, sebacic acid, adduct acids obtained by reaction between maleic anhydride, citraconic anhydride, and either butadiene or cyclopentadiene. Oxalic acid is not quite as satisfactory as some of the other acids, due to its tendency to decompose. In light of raw material costs, it is my preference to use phthalic anhydride, maleic anhydride, citraconic anhydride, diglycollic acid, adipic acid and certain other acids in the same price range which are both cheap and heat-resistant. One may also use adduct acids of the diene or Clocker type.

The present invention is concerned with the last mentioned esters, particularly acidic fractional esters, for the purpose of breaking oil field emulsions.

Briefly then, the present invention is concerned with a process for breaking petroleum emulsions of the water-in-oil type, characterized by subjecting the emulsion to the action of a demulsifier including acidic fractional esters obtained by esterification between the high molal oxypropylation products briefly described above and described in detail in Patent 2,552,528 and polycarboxy acids, particularly dicarboxy acids, and advantageously acids in which the polycarboxy acid radical contains not over 8 carbon atoms, with the further proviso that the ratio of polycarboxy reactant to hydroxylated reactant be in the molar proportion of one mole of polycarboxy acid for each hydroxyl present in the hydroxylated reactant.

Reference is made to Patent 2,552,528, and more particularly Part 1 thereof, appearing in columns 2 through 15, for a complete and detailed description of the polyhydroxy materials, having at least 4 hydroxyl groups, which are water-soluble and xylene-insoluble, and are useful for preparing products used in accordance with the present invention. In addition, reference is made to Part 2 of said patent, appearing in columns 15 through 22, and to the examples and tables for a description of useful ways of oxypropylating these polyhydric materials to produce products which, when esterified with polycarboxy acids, form products used in the practice of the present invention, and for a number of examples of such suitable intermediates.

In the subsequent text there is described the esterification of oxypropylated products such as are described in my Patent 2,552,528 with polycarboxy acids, and particularly dicarboxy acids and anhydrides to yield acidic esters. Such reaction depends, of course, on the presence of hydroxyl radicals. There is a tendency in oxypropylations, and for that matter, in oxyethylations, to some degree, to obtain by-products which do not apparently have a terminal hydroxyl radical, or which are of comparatively low molecular weight, or have some other characteristic. Stated another way, in oxypropylations, particularly instances where the molecular weight divided by the number of initial hydroxyl radicals is in excess of 500, one finds that the actual hydroxyl value is less than the theoretical hydroxyl value, assuming that completeness of reaction took place. In other words, this applies in preparation of polypropylated glycol in molecular weights exceeding 1,000, polypropylated glycerol in molecular weights exceeding 1500, and polypropylated acyclic diglycerol in molecular weights exceeding 2,000, etc. The lower the temperature of oxypropylation, the more nearly the actual molecular weight determination, based on hydroxyl value, will approach the theoretical. This frequently means slower speed of reaction in the presence of more catalyst. For this reason, although one can use oxypropylated derivatives obtained in any manner, it is preferable, everything else being equal, to employ those obtained by oxypropylation at temperatures approximating the boiling point of water, or slightly above, for example, 95° to 120° C. Under such circumstances, the pressure will be less than 30 pounds per square inch unless some special procedure is employed, as is sometimes the case, to wit, keeping an atmosphere of inert gas such as nitrogen in the vessel during the reaction. Such low temperature—low reaction rate oxypropylations, have been described very completely in U. S. Patent No. 2,448,664, to H. R. Fife et al., dated September 7, 1948. Low temperature-low pressure oxypropylations are particularly desirable where the compounds being subjected to oxypropylation contain one, two or three points of reaction only, such as monohydric alcohols, glycols and triols, and this low temperature procedure is valuable even in instances such as the present. Because oxypropylated products obtained under such conditions are particularly desirable for the production of the esters used in the practice of the present invention, in the following text a rather complete description of such operations and specific examples of oxypropylations carried out under such conditions are given.

Since low pressure-low temperature-low reaction speed oxypropylations require considerable time, for instance, 1 to 7 days of 24 hours each to complete the reaction they are conducted as a rule whether on a laboratory scale, pilot plant scale, or large scale, so as to operate automatically. The prior figure of seven days applies especially to large-scale operations. I have used conventional equipment with two added automatic features: (a) a solenoid controlled valve which shuts off the propylene oxide in event that the temperature gets outside a predetermined and set range, for instance, 95° to 120° C.; and (b) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various low temperature oxypropylation examples I have found it particularly advantageous to use laboratory equipment or pilot plant which is designed to permit continuous oxyalkylation, whether it be oxypropylation or oxyethylation. With certain obvious changes, the equipment can be used also to permit oxyalkylation involving the use of glycide, where no pressure is involved except the vapor pressure of a solvent, if any, which may have been used as a diluent.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement, as far as propylene oxide goes, unless there is a reaction of explosive violence involved due to accident. The autoclave was equipped with the conventional devices and openings, such as the variable-speed stirrer operating at speeds from 50 R. P. M. to 500 R. P. M.; the thermometer well and thermocouple for mechanical thermometer; emptying outlet; pressure gauge, manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and, preferably, coils in addition thereto, with the jacket so arranged that it is suitable for heating with steam or cooling with water, and further equipped with electrical heating devices. Such autoclaves are, of course, in essence small-scale replicas of the usual conventional autoclave used in oxyalkylation procedures. In some instances in exploratory preparations an autoclave having a smaller capacity, for instance, approximately 3½ liters in one case, and about 1¾ gallons in another case, was used.

Continuous operation, or substantially continuous operation, was achieved by the use of a separate container to hold the alkylene oxide being employed, particularly propylene oxide. In conjunction with the smaller autoclave, the container consists essentially of a laboratory bomb having a capacity of about one-half gallon, or somewhat in excess thereof. In some instances, a larger bomb was used, to wit, one having a capacity of about one gallon. This bomb was equipped, also, with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform, in that the reaction temperature was held within a few degrees of any selected point, for instance, if 105° C. was selected as the operating temperature the maximum point would be at the most 110° C. or 112° C., and the lower point would be 95°, or possibly, 98° C. Similarly, the pressure was held at approximately 30 pounds within a 5-pound variation one way or the other, but might drop to practically zero, especially where no solvent such as xylene is employed. The speed of reaction was comparatively slow under such conditions, as compared with oxyalkylations at 200° C. Numerous reactions were conducted in which the time varied from one day (24 hours) up to three days (72 hours), for completion of the final member of a series. In some instances, the reaction may take place in considerably less time, i. e., 24 hours or less, as far as a partial oxypropylation is concerned. The minimum time recorded was about a 3-hour period in a single step. Reactions indicated as being complete in 9 hours may have been complete in a lesser period of time, in light of the automatic equipment employed. In the addition of propylene oxide, in the autoclave equipment, as far as possible the valves were set so all the propylene oxide if fed continuously would be added at a rate so that the predetermined amount would react within the first 15 hours of the 24-hour period or two-thirds of any shorter period. This meant that if the reaction was interrupted automatically for a period of time for pressure to drop or temperature to drop, the predetermined amount of oxide would still be added in most instances well within the predetermined time period. Sometimes where the addition was a comparatively small amount in a 12-hour period, there would be an unquestionable speeding up of the reaction, by simply repeating the example and using 6, 8, or 9 hours instead of 12 hours.

When operating at a comparatively high temperature, for instance, between 150 to 200 C., any unreacted alkylene oxide such as propylene oxide, makes its presence felt in the increase in pressure or the consistency of a high pressure. However, at a low enough temperature it may happen that the propylene oxide goes in as a liquid. If so, and if it remains unreacted, there is, of course, an inherent danger and appropriate steps must be taken to safeguard against this possibility; if need be, a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight, the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days time may elapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction the scale movement through a time operating device was set for either one to two hours, so that reaction continued for 1 to 3 hours after the final addition of the last propylene oxide, and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow, continuous run which was shut off in case the pressure passed a predetermined point, as previously set out. All the points of design, construction, etc., were conventional, including the gauges, check valves and entire equipment. As far as I am aware at least two firms, and possibly three, specialize in autoclave equipment, such as I have employed in the laboratory, and are prepared to furnish equipment of this same kind. Similarly, pilot plant equipment is available. This point is simply made as a precaution in the direction of safety. Oxyalkylations, particularly involving ethylene oxide, glycide, propylene oxide, etc., should not be conducted except in equipment specifically designed for the purpose.

Example 1a

The particular autoclave employed was one with a capacity of about 175 pounds of reaction mass. The speed of the stirrer could be varied from 150 to 340 R. P. M. 11 pounds of sorbitol were charged into the autoclave along with 1.1 pounds of sodium hydroxide. The reaction pot was flushed out with nitrogen. The autoclave was sealed, the automatic devices adjusted and set for injecting a total of 83.5 pounds of propylene oxide in approximately a 16-hour period. The pressure regulator was set for a maximum of approximately 35 pounds per square inch. This meant that the bulk of the reaction could take place, and probably did take place, at a lower pressure. This comparatively low pressure was the result of the fact that considerable catalyst was present, the propylene oxide was added comparatively slowly, and more important, the selected temperature range was 220° to 225° F. (slightly above the boiling point of water). The initial introduction of propylene oxide was not started until the heating devices had raised the temperature to somewhere past the boiling point of water, i. e., to about 220° F.

At the completion of the reaction a sample was taken and oxypropylation proceeded as in Example 2a, immediately succeeding.

Example 2a

Slightly over 68.5 pounds of the reaction mass identified as Example 1a, were permitted to remain in the reaction vessel and without the addition of any more catalyst, approximately 31.4 pounds of propylene oxide were added. The oxypropylation was conducted in the same manner in regard to pressure and temperature, as in Example 1a, preceding, except that the reaction mass was completed in about 4 hours. At the end of the reaction period part of the sample was withdrawn and oxypropylation was continued as described in Example 3a, following.

Example 3a

Slightly over 67 pounds of the reaction mass identified as Example 2a, preceding, were permitted to stay in the reaction vessel. 43 pounds of propylene oxide were introduced during this 3-hour period. No additional catalyst was added. The conditions of reaction as far as temperature and pressure were concerned were substantially the same as in Example 1a, preceding. The reaction time in this instance was 9 hours. At the completion of the reaction part of the reaction mass was withdrawn and the remainder subjected to oxypropylation, as described in Example 4a, succeeding.

Example 4a

Slightly less than 72 pounds of the reaction mass identified as Example 3a, preceding, were permitted to remain in the autoclave. No additional catalyst was introduced. A little less than 34.7 pounds of propylene oxide were introduced in the same manner as described in Example 1a, preceding. Conditions in regard to temperature and pressure were substantially the same. The time required to introduce the propylene oxide in this case was 9½ hours. At the end of the reaction period part of the mass was withdrawn and the remainder of the reaction mass subjected to further oxypropylation, as described in Example 5a, immediately succeeding.

Example 5a

Slightly less than 69 pounds of the reaction mass were permitted to stay in the autoclave. No additional catalyst was introduced. Slightly over 10.87 pounds of propylene oxide were introduced in the same manner as described in Example 1a, preceding. The conditions of temperature and pressure were substantially the same. The time required to introduce the oxide was 8 hours. This sample was withdrawn and the remainder of the reaction mass permitted to stay in the autoclave and subjected to further oxypropylation, as described immediately following.

Example 6a

Approximately 52 pounds of the reaction mass identified as Example 5a, preceding, were permitted to stay in the autoclave. This was subjected to reaction with 19.6 pounds of propylene oxide. No additional catalyst was added. The conditions of reaction were substantially the same as described in Example 1a, as far as temperature and pressure were concerned. The time required for the addition of the oxide was 6 hours. Part of this reaction mass was withdrawn and the remainder subjected to a final oxypropylation step, as described in Example 7a, immediately following.

Example 7a

Slightly less than 48 pounds of the reaction mass were permitted to stay in the autoclave. This was subjected to reaction with a little more than 7.0 pounds of propylene oxide. No additional catalyst was added. Conditions of reaction were substantially the same as described in Example 1a, as far as temperature and pressure were concerned. The time required for the addition of the oxide was 5 hours.

Example 8a

A low temperature oxypropylation was employed in connection with pentaerythritol. The start of the procedure was substantially the same as in Example 1a, preceding, except that the autoclave employed was somewhat smaller, i. e., a 15-gallon autoclave having a capacity on the average of about 120 pounds. The speed of the stirrer could be varied from 150 to 340 R. P. M. 7.33 pounds of pentaerythritol were charged into the autoclave along with .75 pound of catalyst and 5.87 pounds of xylene as a solvent. Actually, the xylene probably is not a true solvent, but simply gives a slurry with the pentaerythritol which makes the reaction mass easier to handle in the initial state. The xylene present, of course, represents a comparatively insignificant quantity in subsequent stages and can be removed, if desired, by any suitable means such as vacuum distillation. Also, the presence of this xylene is not objectionable in the esterification step, as will be pointed out subsequently.

As before, the reaction pot was flushed out with nitrogen, the autoclave sealed and the automatic devices adjusted and set for injecting 30.75 pounds of propylene oxide in a 2-hour period. The pressure was set for a maximum of 35 to 37 pounds per square inch. This meant that the bulk of the reaction could take place, and probably did take place, at a lower pressure. The reasons for the lower pressure are, of course, the same as indicated in Example 1a, preceding. The selected temperature range was 220°–225° F. (slightly above the boiling point of water). All other procedure, such as raising the temperature to approximately 220° F. before starting the oxide were the same as in Example 1a, preceding.

At the end of the oxypropylation period, part of the reaction mixture was withdrawn for a sample and the remainder subjected to further oxypropylation, as described immediately following.

*Example 9a*

Slightly over 32⅓ pounds of the reaction mixture identified as Example 8a, preceding, were permitted to stay in the reaction vessel and without the addition of any more catalyst, a little less than 41.25 pounds of propylene oxide were introduced into the autoclave.

The oxypropylation was conducted in substantially the same manner in regard to pressure and temperature, as described in Example 1a, and for that matter, in Example 8a, preceding, except that the reaction was complete in approximately 4 hours.

At the end of the reaction period, part of the sample was withdrawn and oxypropylation was continued, as described in Example 10a, following.

*Example 10a*

Approximately 44 pounds of the reaction mass identified as Example 9a, preceding, were permitted to stay in the reaction vessel. 23.75 pounds of propylene oxide were introduced during this particular period. No additional catalyst was added. The conditions of reaction, as far as temperature and pressure were concerned, were substantially the same as in Example 1a, preceding. The reaction time in this instance was cut down to 3 hours. At the completion of the reaction, part of the mass was withdrawn and the remainder subjected to oxypropylation in the manner described in Example 11a, following.

*Example 11a*

Approximately 48 pounds of the reaction mass were permitted to stay in the autoclave. No additional catalyst was introduced. Slightly less than 20.25 pounds of propylene oxide were introduced in the same manner as described in Example 1a, preceding. Conditions in regard to temperature and pressure were substantially the same. In this instance the oxide was introduced in 5 hours. At the end of the reaction, part of the reaction mass was withdrawn and the remainder of the mass subjected to a final oxypropylation, as described in Example 12a, succeeding.

*Example 12a*

Approximately 47 pounds of the reaction mass were permitted to stay in the autoclave. No additional catalyst was introduced. 27.94 pounds of propylene oxide were introduced in the same manner as described in Example 1a, preceding. The conditions of reaction and pressure were substantially the same as in Example 1a. The time required to introduce the oxide was 8 hours.

What has been said preceding in regard to Examples 1a through 12a is repeated in tabular form, immediately following, with some added information as to molecular weight and as to solubility of the reaction product in water, xylene and kerosene.

Incidentally, the presence of xylene in Examples 8a to 12a, inclusive, does have some effect in the comparison between the theoretical molecular weight and the actual molecular weight, insofar that possibly some of the xylene was lost, and thus had some slight effect. This factor, however, is worth noting, but is not significant, for reasons which are obvious.

TABLE V

| Ex. No. | Composition Before | | | Composition at End | | | | M. W. by Hyd. Determin. | Max. Temp., °F. | Max. Pres., lbs. sq. in. | Time, Hrs. |
|---|---|---|---|---|---|---|---|---|---|---|---|
| | H. C.[1] Amt., lbs. | Oxide Amt., lbs. | Catalyst, lbs. | Theo. Mol. Wt. | H. C.[1] Amt., lbs. | Oxide Amt., lbs. | Catalyst, lbs. | | | | |
| 1a | 11.0 | -------- | 1.1 | 1,564 | 11.0 | 83.50 | 1.10 | 1,446 | 220–225 | 35 | 16 |
| 2a | 7.88 | 59.93 | .79 | 2,290 | 7.88 | 91.33 | .79 | 2,020 | 220–225 | 35 | 4 |
| 3a | 5.29 | 61.36 | .53 | 3,770 | 5.29 | 104.36 | .53 | 3,190 | 220–225 | 35 | 9 |
| 4a | 3.46 | 68.12 | .35 | 5,600 | 3.46 | 102.82 | .35 | 4,110 | 220–225 | 35 | 9½ |
| 5a | 2.24 | 66.41 | .23 | 7,300 | 2.24 | 75.28 | .23 | 4,830 | 220–225 | 35 | 8 |
| 6a | 1.50 | 50.4 | .15 | 8,662 | 1.50 | 70.00 | .15 | 5,730 | 220–225 | 35 | 6 |
| 7a | 1.00 | 46.6 | .10 | 9,830 | 1.00 | 53.6 | .10 | 6,500 | 220–225 | 35 | 5 |
| 8a | 7.38 | -------- | .75 | 700 | 7.38 | 30.75 | .75 | 884 | 220–225 | 35–37 | 2 |
| 9a | 6.15 | 25.6 | .63 | 1,610 | 6.15 | 66.85 | .63 | 1,620 | 220–225 | 35–37 | 4 |
| 10a | 3.63 | 40.0 | .38 | 2,495 | 3.68 | 63.75 | .38 | 2,340 | 220–225 | 35–37 | 3 |
| 11a | 2.65 | 45.15 | .27 | 3,495 | 2.65 | 65.40 | .27 | 3,100 | 220–225 | 35–37 | 5 |
| 12a | 1.83 | 45.06 | .19 | 5,656 | 1.83 | 73.0 | .19 | 4,460 | 220–225 | 35–37 | 8 |

[1] The hydroxylated material was commercial anhydrous sorbitol in Examples 1a through 7a, and in Examples 8a through 12a the hydroxylated material was commercial pentaerythritol.

In the following table the solubility of the products identified as Examples 1a through 12a is shown, together with the amount of solvent in Examples 8a through 12a. No solvent was present, of course, in Examples 1a through 7a.

TABLE VI

| Example No. | Amt. solvent, lbs. in total reaction mass at beginning of oxypropylation | Solubility in— | | |
|---|---|---|---|---|
| | | Water | Xylene | Kerosene |
| 1a | | Soluble | Soluble | Insoluble. |
| 2a | | Dispers. to insol. | do | Do. |
| 3a | | Insoluble | do | Do. |
| 4a | | do | do | Soluble. |
| 5a | | do | do | Do. |
| 6a | | do | do | Do. |
| 7a | | do | do | Do. |
| 8a | 5.87 | Soluble to Emuls. | do | Insoluble. |
| 9a | 4.87 | Emuls | do | Do. |
| 10a | 2.91 | Insoluble | do | Dispersible to soluble. |
| 11a | 2.06 | do | do | Soluble. |
| 12a | 1.42 | do | do | Do. |

The products obtained as described above, that is, the intermediates obtained by the oxypropylation step, were somewhat viscous, and usually were of a very pale straw color and water-insoluble. This is characteristic of all the various products obtained, as previously described. These oxyalkylation products are, of course, slightly alkaline, due to the residual caustic soda employed. This would be true also if sodium methylate were used as a catalyst.

Speaking of insolubility in water or solubility in kerosene, such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weights exceed 2,000. In some instances, the acetyl value or hydroxyl value serves as satisfactorily as an index to the molecular weight as any other procedure, subject to the above limitations, and especially in the higher molecular weight range. If any difficulty is encountered in the manufacture of the esters, the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

As previously pointed out, the present invention is concerned with the resolution of petroleum emulsions by means of certain acidic esters. These are the esters of the oxypropylated derivatives described in Patent 2,552,528, and described above with polycarboxy acids, particularly dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from products such as maleic anhydride, and cyclopentadiene. Such acids should be heat stable so they are not decomposed during esterification. They may contain as many as 36 carbon atoms, as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides, or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy, it is customary to use either the acid or the anhydride. A conventional procedure is employed. On a laboratory scale one can employ a resin pot of the kind described in U. S. Patent No. 2,499,370, dated March 7, 1950, to DeGroote & Keiser, and particularly with one more opening to permit the use of a porous spreader if hydrochloric acid gas is to be used as a catalyst. Such device or absorption spreader consists of minute alundum thimbles which are connected to a glass tube. One can add a sulfonic acid such as paratoluene sulfonic acid as a catalyst. There is some objection to this, because in some instances, there is some evidence that this acid catalyst tends to decompose or rearrange the oxypropylated compounds, and particularly likely to do so if the esterification temperature is too high. In the case of polycarboxy acids such as diglycollic acid, which is strongly acidic, there is no need to add any catalyst. The use of hydrochloric gas has one advantage over paratoluene sulfonic acid, and that is, that at the end of the reaction it can be removed by flushing out with nitrogen, whereas, there is no reasonably convenient means available of removing the paratoluene sulfonic acid or other sulfonic acid employed. If hydrochloric acid is employed, one need only pass the gas through at an exceedingly slow rate, so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the diol, as described in the final procedure just preceding Table II.

The oxypropylated products, as produced, may contain a basic catalyst. As a general procedure, I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage, needless to say, a second filtration may be required. In any event, the neutral or slightly acidic solution of the oxypropylated derivatives is then diluted further with sufficient xylene, decalin, petroleum solvent, or the like, so that one has obtained approximately a 45% solution. To this solution there is added a polycarboxylated reactant, as previously described, such as phthalic anhydride, succinic acid or anhydride, diglycollic acid, etc. The mixture is refluxed until esterification is complete, as indicated by elimination of water or drop in carboxyl value. Needless to say, if one produces a half-ester from an anhydride, such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent, or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the sodium sulfate and probably the sodium chloride formed. The clear, somewhat viscous, straw-colored amber liquid so obtained may contain a small amount of sodium sulfate or sodium chloride, but in any event, is perfectly acceptable for esterification in the manner described.

It is to be pointed out that the products here described are not polyesters in the sense that there is a plurality of both polyol radicals and acid radicals; the product is characterized by having only one polyol radical.

In some instances, and in fact, in many instances, I have found that in spite of the dehydration methods employed above, a mere trace of water still comes through and that this mere trace of water certainly interferes with the acetyl or hydroxyl value determination, at least when a number of conventional procedures are used, and may retard esterification, particularly where there is no sulfonic acid or hydrochloric acid present as a catalyst. Therefore, I have preferred to use the following procedure: I have employed about 200 grams of the polyol; I have added about 60 grams of benzene, and then refluxed this mixture in the glass resin pot using a phase-separating trap until the benzene carried out all the water present as water of solution or the equivalent. Ordinarily, this refluxing temperature is apt to be in the neighborhood of 130° to possibly 150° C. When all this water or moisture has been removed, I also withdraw approximately 20 grams or a little less benzene and then add the required amount of the carboxy reactant and also about 150 grams of a high boiling aromatic petroleum solvent. These solvents are sold by various oil refineries, and, as far as solvent effect, act as if they were almost completely aromatic in character. Typical distillation data in the particular type I have employed and found very satisfactory is the following:

| | |
|---|---|
| I. B. P., 142° C. | 50 ml., 242° C. |
| 5 ml., 200° C. | 55 ml., 244° C. |
| 10 ml., 209° C. | 60 ml., 248° C. |
| 15 ml., 215° C. | 65 ml., 252° C. |
| 20 ml., 216° C. | 70 ml., 252° C. |
| 25 ml., 220° C. | 75 ml., 260° C. |
| 30 ml., 225° C. | 80 ml., 264° C. |
| 35 ml., 230° C. | 85 ml., 270° C. |
| 40 ml., 234° C. | 90 ml., 280° C. |
| 45 ml., 237° C. | 95 ml., 307° C. |

After this material is added, refluxing is continued, and, of course, is at a high temperature, to wit, about 160° to 170° C. If the carboxy reactant is an anhydride, needless to say, no water of reaction appears; if the carboxy reactant is an acid water of reaction should appear and should be eliminated at the above reaction temperature. If it is not eliminated I simply separate out another 10 or 20 cc. of benzene by means of the phase-separating trap, and thus, raise the temperature to 180° or 190° C., or even to 200° C., if need be. My preference is not to go above 200° C.

The use of such solvent is extremely satisfactory, provided one does not attempt to remove the solvent subsequently, except by vacuum distillation, and provided there is no objection to a little residue. Actually, when these materials are used for a purpose such as demulsification, the solvent might just as well be allowed to remain. If the solvent is to be removed by distillation, and particularly vacuum distillation, then the high boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

In the appended Tables Nos. VII and VIII, it will be noted that in numerous instances the solvent employed was indicated as Solvent #7–3. This means a mixture of 7 volumes of aromatic petroleum solvent, previously described, and three parts of benzene. This was used in the same manner as xylene or any other customary solvent in connection with a procedure of this kind. In some instances, there was an incipient tendency towards cross-linking or gelation, and as a result, a tendency for the reaction product to separate from the benzene-petroleum emulsion mixture. In such instances, and this applies particularly to penta-derivatives, a small amount of benzene, for instance, 10% to 20% of the solvent, i. e., 10% or 20% out of a total 30% present, was allowed to distil out and Diethyl Carbitol added. This still gave a boiling point within a suitable range and gave complete solubility of the reaction mass and reactants. In one or two instances, as indicated, a sample was discarded because it did solidify. Any suitable solvent and any suitable temperature can be employed.

The data in the subsequent tables, i. e., Tables VII and VIII, are self-explanatory and very complete, and it is believed that no further elaboration is necessary.

TABLE VII

| Ex. No. of Acid Ester | Ex. No. of Hydroxy Cmpd. | Theo. M. W. of H. C. | Theo. Hydroxyl Value of H. C. | Actual Hydroxyl Value | Mol. Wt. Based on Actual H. V. | Amt. of Hyd. Cmpd. (grs.) | Polycarboxy Reactant | Amt. of Polycarboxy Reactant (grs.) |
|---|---|---|---|---|---|---|---|---|
| 1b | 1a | 1,564 | 215 | 232 | 1,446 | 203 | Diglycollic Acid | 113 |
| 2b | 1a | 1,564 | 215 | 232 | 1,446 | 206 | Phthalic Anhydride | 126 |
| 3b | 1a | 1,564 | 215 | 232 | 1,446 | 205 | Maleic Anhydride | 83.5 |
| 4b | 1a | 1,564 | 215 | 232 | 1,446 | 201 | Aconitic Acid | 144 |
| 5b | 1a | 1,564 | 215 | 232 | 1,446 | 202 | Citraconic Anhydride | 94 |
| 6b | 1a | 1,564 | 215 | 232 | 1,446 | 201 | Aconitic Acid | 145 |
| 7b | 2a | 2,290 | 147.5 | 166 | 2,020 | 203 | Diglycollic Acid | 80.7 |
| 8b | 2a | 2,290 | 147.5 | 166 | 2,020 | 203 | Phthalic Anhydride | 88.6 |
| 9b | 2a | 2,290 | 147.5 | 166 | 2,020 | 203 | Maleic Anhydride | 59.5 |
| 10b | 2a | 2,290 | 147.5 | 166 | 2,020 | 204 | Aconitic Acid | 105.5 |
| 11b | 2a | 2,290 | 147.5 | 166 | 2,020 | 202 | Citraconic Anhydride | 67.2 |
| 12b | 2a | 2,290 | 147.5 | 166 | 2,020 | 203 | Diglycollic Acid | 80.7 |
| 13b | 3a | 3,770 | 90.8 | 105 | 3,190 | 196 | do | 49.2 |
| 14b | 3a | 3,770 | 90.8 | 105 | 3,190 | 203 | Phthalic Anhydride | 56.4 |
| 15b | 3a | 3,770 | 90.8 | 105 | 3,190 | 203 | Maleic Anhydride | 33.1 |
| 16b | 3a | 3,770 | 90.8 | 105 | 3,190 | 197 | Aconitic Acid | 64.5 |
| 17b | 3a | 3,700 | 90.8 | 105 | 3,190 | 202 | Citraconic Anhydride | 42.5 |
| 18b | 4a | 5,600 | 60.2 | 81.7 | 4,110 | 203 | Diglycollic Acid | 39.2 |
| 19b | 4a | 5,600 | 60.2 | 81.7 | 4,110 | 203 | Phthalic Anhydride | 43.5 |
| 20b | 4a | 5,600 | 60.2 | 81.7 | 4,110 | 203 | Maleic Anhydride | 28.4 |
| 21b | 4a | 5,600 | 60.2 | 81.7 | 4,110 | 207 | Aconitic Acid | 52.5 |
| 22b | 4a | 5,600 | 60.2 | 81.7 | 4,110 | 203 | Citraconic Anhydride | 33.1 |
| 23b | 5a | 7,300 | 46.8 | 69.6 | 4,830 | 205 | Diglycollic Acid | 34.2 |
| 24b | 5a | 7,300 | 46.8 | 69.6 | 4,830 | 207 | Phthalic Anhydride | 38.2 |
| 25b | 5a | 7,300 | 46.8 | 69.6 | 4,830 | 207 | Maleic Anhydride | 25.2 |
| 26b | 5a | 7,300 | 46.8 | 69.6 | 4,830 | 206 | Aconitic Acid | 44.4 |
| 27b | 5a | 7,300 | 46.8 | 69.6 | 4,830 | 200 | Citraconic Anhydride | 28.0 |
| 28b | 8a | 700 | 321 | 254 | 884 | 195 | Diglycollic Acid | 118 |
| 29b | 8a | 700 | 321 | 254 | 884 | 195 | Phthalic Anhydride | 130 |
| 30b | 8a | 700 | 321 | 254 | 884 | 206 | Maleic Anhydride | 90 |
| 31b | 8a | 700 | 321 | 254 | 884 | 205 | Citraconic Anhydride | 103 |
| 32b | 8a | 700 | 321 | 254 | 884 | 205 | Aconitic Acid | 160 |
| 33b | 8a | 700 | 321 | 254 | 884 | 204 | Oxalic Acid | 115 |
| 34b | 8a | 700 | 321 | 254 | 884 | 187 | do | 107 |
| 35b | 9a | 1,610 | 140 | 139 | 1,620 | 207 | Diglycollic Acid | 68.5 |
| 36b | 9a | 1,610 | 140 | 139 | 1,620 | 202 | Phthalic Anhydride | 74 |
| 37b | 9a | 1,610 | 140 | 139 | 1,620 | 202 | Maleic Anhydride | 48 |
| 38b | 9a | 1,610 | 140 | 139 | 1,620 | 207 | Citraconic Anhydride | 57.3 |
| 39b | 9a | 1,610 | 140 | 139 | 1,620 | 206 | Aconitic Acid | 88.4 |
| 40b | 9a | 1,610 | 140 | 139 | 1,620 | 204 | Oxalic Acid | 63.0 |
| 41b | 10a | 2,495 | 90 | 96 | 2,340 | 202 | Diglycollic Acid | 46.1 |
| 42b | 10a | 2,495 | 90 | 96 | 2,340 | 200 | Phthalic Anhydride | 50.4 |
| 43b | 10a | 2,495 | 90 | 96 | 2,340 | 200 | Maleic Anhydride | 33.7 |
| 44b | 10a | 2,495 | 90 | 96 | 2,340 | 206 | Citraconic Anhydride | 39.4 |
| 45b | 10a | 2,495 | 90 | 96 | 2,340 | 206 | Aconitic Acid | 51.0 |
| 46b | 10a | 2,495 | 90 | 96 | 2,340 | 209 | Oxalic Acid | 44.8 |
| 47b | 11a | 3,495 | 64.4 | 72.5 | 3,100 | 202 | Diglycollic Acid | 34.8 |
| 48b | 11a | 3,495 | 64.4 | 72.5 | 3,100 | 204 | Phthalic Anhydride | 52.4 |
| 49b | 11a | 3,495 | 64.4 | 72.5 | 3,100 | 202 | Maleic Anhydride | 25.6 |
| 50b | 11a | 3,495 | 64.4 | 72.5 | 3,100 | 205 | Citraconic Anhydride | 29.2 |
| 51b | 11a | 3,495 | 64.4 | 72.5 | 3,100 | 208 | Aconitic Acid | 46.3 |
| 52b | 11a | 3,495 | 64.4 | 72.5 | 3,100 | 216 | Oxalic Acid | 32.0 |
| 53b | 12a | 5,656 | 39.8 | 50.4 | 4,460 | 208 | Diglycollic Acid | 24.9 |
| 54b | 12a | 5,656 | 39.8 | 50.4 | 4,460 | 211 | Phthalic Anhydride | 23.0 |
| 55b | 12a | 5,656 | 39.8 | 50.4 | 4,460 | 216 | Maleic Anhydride | 19.0 |
| 56b | 12a | 5,656 | 39.8 | 50.4 | 4,460 | 220 | Citraconic Anhydride | 22.1 |
| 57b | 12a | 5,656 | 39.8 | 50.4 | 4,460 | 203 | Aconitic Acid | 31.6 |
| 58b | 12a | 5,656 | 39.8 | 50.4 | 4,460 | 203 | Oxalic Acid | 22.9 |

TABLE VIII

| Ex. No. of Acid Ester | Solvent | Amt. Solvent (grs.) | Esterification Temp., °C. | Time of Esterification (hrs.) | Water Out (cc.) | Remarks |
|---|---|---|---|---|---|---|
| 1b | #7-3 | 336 | 120 | 1½ | 12.6 | Sample had tendency to solidify excessively and was discarded. |
| 2b | #7-3 | 339 | 138 | 3 | None | |
| 3b | #7-3 | 289 | 135 | 2 | None | |
| 4b | #7-3 | 330 | 138 | 2 | 8.6 | Sample had tendency to solidify excessively and was discarded. |
| 5b | #7-3 | 296 | 158 | 2½ | 0.8 | |
| 6b | #7-3 | 328 | 137 | 3 | 7.0 | Sample had tendency to solidify excessively and was discarded. |
| 7b | #7-3 | 275 | 139 | 1¼ | 10.0 | Do. |
| 8b | #7-3 | 280 | 187 | 10 | | |
| 9b | #7-3 | 297 | 150 | 3½ | None | |
| 10b | #7-3 | 307 | 136 | 7 | 10.2 | |
| 11b | #7-3 | 269 | 138 | 1¼ | None | |
| 12b | #7-3 | 272 | 144 | 1 | 8.2 | |
| 13b | #7-3 | 246 | 153 | 1¼ | 6.0 | Sample had tendency to solidify excessively and was discarded. |

TABLE VIII—Continued.

| Ex. No. of Acid Ester | Solvent | Amt. Solvent (grs.) | Esterification Temp., °C. | Time of Esterification (hrs.) | Water Out (cc.) | Remarks |
|---|---|---|---|---|---|---|
| 14b | #7-3 | 264 | 157 | 9 | None | |
| 15b | #7-3 | 236 | 135 | 3½ | None | |
| 16b | #7-3 | 255 | 167 | 1¾ | 6.6 | |
| 17b | #7-3 | 245 | 156 | 2½ | None | |
| 18b | #7-3 | 238 | 165 | 2 | 4.2 | |
| 19b | #7-3 | 247 | 147 | 10¼ | None | |
| 20b | #7-3 | 233 | 135 | 4¾ | None | |
| 21b | #7-3 | 259 | 149 | 4 | 5.2 | |
| 22b | #7-3 | 241 | 150 | 3 | None | |
| 23b | #7-3 | 239 | 157 | 3 | 4.3 | |
| 24b | #7-3 | 256 | 165 | 7 | None | |
| 25b | #7-3 | 235 | 144 | 4 | None | |
| 26b | #7-3 | 245 | 151 | 4¾ | 4.5 | |
| 27b | #7-3 | 228 | 151 | 2 | 0.4 | |
| 28b | #7-3 Diethyl Carbitol | 296 | 132 | 3 | 16.3 | |
| 29b | do | 324 | 163 | 4 | 0.6 | |
| 30b | do | 294 | 136 | 2½ | 0.8 | |
| 31b | do | 307 | 166 | 2 | | |
| 32b | do | 351 | 147 | 5 | 16.9 | |
| 33b | do | 340 | 95 | 2 | 53.0 | Sample had tendency to solidify excessively and was discarded. |
| 34b | do | 248 | 114 | 1½ | 45.8 | |
| 35b | #7-3 | 269 | 145 | 3½ | 9.0 | |
| 36b | #7-3 | 276 | 149 | 5½ | | |
| 37b | #7-3 | 250 | 142 | 2½ | 0.5 | |
| 38b | #7-3 | 264 | 149 | 2½ | 0.4 | |
| 39b | #7-3 | 285 | 182 | 4½ | 9.2 | |
| 40b | #7-3 | 240 | 140 | 1½ | 28.4 | |
| 41b | #7-3 | 242 | 178 | 3 | 6.5 | |
| 42b | #7-3 | 250 | 161 | 8 | 0.4 | |
| 43b | #7-3 | 234 | 152 | 2½ | 0.2 | |
| 44b | #7-3 | 246 | 145 | 2 | | |
| 45b | #7-3 | 261 | 173 | 5½ | 7.1 | |
| 46b | #7-3 | 234 | 137 | 1 | 20.0 | |
| 47b | #7-3 | 232 | 152 | 2½ | 4.4 | |
| 48b | #7-3 | 256 | 158 | 8 | | |
| 49b | #7-3 | 231 | 159 | 1½ | 0.2 | |
| 50b | #7-3 | 234 | 153 | 1½ | | |
| 51b | #7-3 | 249 | 174 | 6½ | 5.2 | |
| 52b | #7-3 | 216 | 142 | 1 | 15.0 | |
| 53b | #7-3 | 230 | 150 | 8 | 2.3 | |
| 54b | #7-3 | 239 | 158 | 4½ | | |
| 55b | #7-3 | 235 | 159 | 3 | | |
| 56b | #7-3 | 242 | 154 | 2¾ | | |
| 57b | #7-3 | 228 | 175 | 1 | 3.4 | |
| 58b | #7-3 | 216 | 139 | 3¼ | 10.4 | |

In a few of the above instances where there was a tendency to solidify or gel, the experiment was repeated subsequently using a mixture of 50% Diethyl Carbitol and 50% of Solvent #7-3. The reaction was conducted very slowly and a suitable solution or suspension obtained in the various repeated samples. These data are not included, because this would merely be repetitious and would increase the rather extensive data already given.

The procedure for manufacturing the esters has been illustrated by preceding examples. If, for any reason, reaction does not take place in a manner that is acceptable, attention should be directed to the following details:

(a) Recheck the hydroxyl or acetyl value of the oxypropylated product and use a stoichiometrically equivalent amount of acid;

(b) If the reaction does not proceed with reasonable speed, either raise the temperatures indicated, or else extend the period of time up to 12 or 16 hours, if need be;

(c) If necessary, use ½% of paratoluene sulfonic acid or some other acid as a catalyst;

(d) If the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal as the size of the molecule increases and the reactive hydroxyl radical represents a smaller fraction of the entire molecule and thus more difficulty is involved in obtaining complete esterification.

Even under the most carefully controlled conditions of oxypropylation involving comparatively low temperatures and long time of reaction there are formed certain compounds whose composition is still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances, an attempt to react the stoichiometric amount of a polycarboxy acid with the oxypropylated derivative results in an excess of the carboxylated reactant, for the reason that apparently under conditions of reaction less reactive hydroxyl radicals are present than indicated by the hydroxyl value. Under such circumstances, there is simply a residue of the carboxylic reactant, which can be removed by filtration, or, if desired, the esterification procedure can be repeated using an appropriately reduced ratio of carboxylic reactant.

Even the determination of the hydroxyl value by conventional procedure leaves much to be desired, due either to the cogeneric materials previously referred to, or for that matter, the presence of any inorganic salts or propylene oxide. Obviously, this oxide should be eliminated.

The solvent employed, if any, can be removed from the finished ester by distillation, and particularly vacuum distillation. The final products or liquids are generally pale amber to amber in color, and show moderate viscosity. They can be bleached with bleaching clays, filtering chars, and the like. However, for the purpose of demulsification or the like, color is not a factor and decolorization is not justified.

In the above instances I have permitted the solvents to remain present in the final reaction mass. In other instances I have followed the same procedure using decalin or a mixture of decalin and benzene in the same manner and ultimately removed all the solvents by vacuum distillation. Appearances of final products are much the same as the polyols before esterification, and in some instances, were somewhat darker in color and had a reddish cast and perhaps somewhat more viscous.

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone, or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000, or 1 to 20,000, or 1 to 30,000, or even 1 to 40,000, or 1 to 50,000, as in desalting practice, such an apparent insolubility in oil and water is not significant, because said reagents undoubtedly have solubility within such concentrations. This same fact is true in regard to the material or materials employed as the demulsifying agent of my process.

In practising my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example, by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example, at the suction side of said circulating pump.

In a second type of treating procedure, the demulsifier is introduced into the well fluids at the well head, or at some point between the wellhead and the final oil storage tank, by means of an adjustable proportioning mechanism or proportioning pump. Ordinarily, the flow of fluids through the subsequent lines and fittings suffices to produce the desired degree of mixing of demulsifier and emulsion, although in some instances, additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom, so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained the pump is regulated until experience shows that the amount of demulsifier being added is just sufficient to produce clean or dehydrated oil. The amount being fed at such stage is usually 1:10,000, 1:15,000, 1:20,000, or the like.

In many instances, the oxyalkylated products herein specified as demulsifiers can be conveniently used without dilution. However, as previously noted, they may be diluted as desired, with any suitable solvent. For instance, by mixing 75 parts, by weight, of the product of Example 19b with 15 parts, by weight, of xylene and 10 parts, by weight, of isopropyl alcohol, an excellent demulsifier is obtained. Selection of the solvent will vary, depending upon the solubility characteristics of the oxyalkylated product, and of course, will be dictated, in part, by economic consideration, i. e., cost.

As noted above, the products herein described may be used not only in diluted form, but also may be used admixed with some other chemical demulsifier. A mixture which illustrates such combination is the following:

Oxyalkylated derivative, for example, the product of Example 19b, 20%;

A cyclohexylamine salt of a polypropylated naphthalene monosulfonic acid, 24%;

An ammonium salt of a polypropylated naphthalene mono-sulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

Having thus described my invention, what I claim as new and desire to secure by Letters Patent is:

1. A process for breaking petroleum emulsions of the water-in-oil type, characterized by subjecting the emulsion to the action of a demulsifier including acidic fractional esters obtained by esterification between (A) high molal oxypropylation derivatives of monomeric polyhydric compounds with the proviso that (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-soluble and xylene-insoluble; (d) the oxypropylation end product be water-insoluble and xylene-soluble; (e) the oxypropylation end product be within the molecular weight range of 2000 to 30,000 on an average statistical basis; (f) the solubility characteristics of the oxypropylation end product in respect to water and xylene be substantially the result of the oxypropylation step; (g) the ratio of propylene oxide per hydroxyl in the initial polyhydric reactant be within the range of 7 to 70; (h) the initial polyhydric reactant represent not more than 12½%, by weight, of the oxypropylation end product on a statistical basis; (i) the preceding provisos being based on complete reaction involving the propylene oxide and the initial polyhydric reactant; and (B) polycarboxy reactants, and with the further proviso that the ratio of polycarboxy reactant to hydroxylated reactant be in the molar proportion of one mole of polycarboxy reactant for each hydroxyl present in the alcoholic reactant.

2. A process for breaking petroleum emulsions of the water-in-oil type, characterized by subjecting the emulsion to the action of a demulsifier including acidic fractional esters obtained by esterification between (A) high molal oxypropylation derivatives of monomeric polyhydric compounds with the proviso that (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-soluble and xylene-insoluble; (d) the oxypropylation end product be water-insoluble and xylene-soluble; (e) the oxypropylation end product be within the molecular weight range of 2000 to 30,000 on an average statistical basis; (f) the solubility characteristics of the oxypropylation end product in respect to water and xylene be substantially the result of the oxypropylation step; (g) the ratio of propylene oxide per hydroxyl in the initial polyhydric reactant be within the range of 7 to 70; (h) the initial polyhydric reactant represent not more than 12½%, by weight, of the oxypropylation end product on a statistical basis; (i) the preceding provisos being based on complete reaction involving the propylene oxide and the initial polyhydric reactant; and (B) dicarboxy reactants, and with the further proviso that the ratio of dicarboxy reactant to hydroxylated reactant be in the molar proportion of one mole of dicarboxy reactant for each hydroxyl present in the alcoholic reactant.

3. A process for breaking petroleum emulsions of the water-in-oil type, characterized by subjecting the emulsion to the action of a demulsifier including acidic fractional esters obtained by esterification between (A) high molal oxypropylation derivatives of monomeric polyhydric compounds with the proviso that (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-soluble and xylene-insoluble; (d) the oxypropylation end product be water-insoluble and xylene-soluble; (e) the oxypropylation end product be within the molecular weight range of 2000 to 30,000 on an average statistical basis; (f) the solubility characteristics of the oxypropylation end product in respect to water and xylene be substantially the result of the oxypropylation step; (g) the ratio of propylene oxide per hydroxyl in the initial polyhydric reactant be within the range of 7 to 70; (h) the initial polyhydric reactant represent not more than 12½%, by weight, of the oxypropylation end product on a statistical basis; (i) the preceding provisios being based on complete reaction involving the propylene oxide and the initial polyhydric reactant; and (B) dicarboxy reactants having not over 8 carbon atoms, and with the further proviso that the ratio of dicarboxy reactant to hydroxylated reactant be in the molar proportion of one mole of dicarboxy reactant for each hydroxyl present in the alcoholic reactant.

4. A process for breaking petroleum emulsions of the water-in-oil type, characterized by subjecting the emulsion to the action of a demulsifier including acidic fractional esters obtained by esterification between (A) high molal oxypropylation derivatives of monomeric heat-resistant polyhydric compounds with the proviso that (a) the initial polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-soluble and xylene-insoluble; (d) the oxypropylation end product be water-insoluble and xylene-soluble; (e) the oxypropylation end product be within the molecular weight range of 2000 to 30,000 on an average statistical basis; (f) the solubility characteristics of the oxypropylation end product in respect to water and xylene be substantially the result of the oxypropylation step; (g) the ratio of propylene oxide per hydroxyl in the initial polyhydric reactant be within the range of 7 to 70; (h) the initial polyhydric reactant represent not more than 12½%, by weight, of the oxypropylation end product on a statistical basis; (i) the preceding provisos being based on complete reaction involving the propylene oxide and the initial polyhydric reactant; (j) said heat-resistance meaning stability at 150° to 170° C., in presence of approximately 1% of an alkaline catalyst and in absence of an oxidized medium, such as air; and (B) dicarboxy reactants having not over 8 carbon atoms, and with the further proviso that the ratio of dicarboxy reactant to hydroxylated reactant be in the molar proportion of one mole of dicarboxy reactant for each hydroxyl present in the alcoholic reactant.

5. A process for breaking petroleum emulsions of the water-in-oil type, characterized by subjecting the emulsion to the action of a demulsifier including acidic fractional esters obtained by esterification between (A) high molal oxypropylation derivatives of monomeric heat-resistant polyhydric compounds with the proviso that (a) the polyhydric reactant be free from any radical having at least 8 uninterrupted carbon atoms; (b) the initial polyhydric reactant have a molecular weight not over 1200 and at least 4 hydroxyl radicals; (c) the initial polyhydric reactant be water-soluble and xylene-insoluble; (d) the oxypropylation end product be water-insoluble and xylene-soluble; (e) the oxypropylation end product be within the molecular weight range of 2000 to 30,000 on an average statistical basis; (f) the solubility characteristics of the oxypropylation end product in respect to water and xylene be substantially the result of the oxypropylation step; (g) the ratio of propylene oxide per hydroxyl in the initial polyhydric reactant be within the range of 7 to 70; (h) the initial polyhydric reactant represent not more than 12½%, by weight, of the oxypropylation end product on a statistical basis; (i) the preceding provisos being based on complete reaction involving the propylene oxide and the initial polyhydric reactant; (j) said heat-resistance meaning stability at 150° to 170° C., in presence of approximately 1% of an alkaline catalyst and in absence of an oxidized medium, such as air; (k) the oxygen present in the initial polyhydric reactant be in the form of a radical selected from the class consisting of hydroxyl radicals, external ether radicals, inner ether radicals, ester radicals containing a low molal monoacyl radical, ester radicals containing a low molal alkyl radical, ketone radicals, aldehyde radicals, carboxy radicals, ketal radicals and acetal radicals; and (B) dicarboxy reactants having not over 8 carbon atoms, and with the further proviso that the ratio of dicarboxy reactant to hydroxylated reactant be in the molar proportion of one mole of dicarboxy reactant for each hydroxyl present in the alcoholic reactant.

6. The process of claim 5, wherein the molecular weight based on hydroxyl value determination is within the range of 2000 to 7000.

7. The process of claim 5, wherein the molecular weight based on hydroxyl value determination is within the range of 2000 to 7000, and the dicarboxy reactant is diglycollic acid.

8. The process of claim 5, wherein the molecular weight based on hydroxyl value determination is within the range of 2000 to 7000, and the dicarboxy reactant is phthalic anhydride.

9. The process of claim 5, wherein the molecular weight based on hydroxyl value determination is within the range of 2000 to 7000, and the dicarboxy reactant is maleic anhydride.

10. The process of claim 5, wherein the molecular weight based on hydroxyl value determination is within the range of 2000 to 7000, and the dicarboxy reactant is citraconic anhydride.

11. The process of claim 5, wherein the molecular weight based on hydroxyl value determination is within the range of 2000 to 7000, and the dicarboxy reactant is oxalic acid.

MELVIN DE GROOTE.

REFERENCES CITED

The following references are of record in the file of this patent:

UNITED STATES PATENTS

| Number | Name | Date |
|---|---|---|
| 2,295,165 | De Groote et al. | Sept. 8, 1942 |
| 2,341,846 | Meincke | Feb. 15, 1944 |
| 2,357,933 | De Groote et al. | Sept. 12, 1944 |
| 2,552,538 | De Groote et al. | May 15, 1951 |
| 2,562,878 | Blair | Aug. 7, 1951 |